US009725939B2

(12) United States Patent
Adair et al.

(10) Patent No.: US 9,725,939 B2
(45) Date of Patent: Aug. 8, 2017

(54) ROTATABLE HINGE

(71) Applicant: Hurco Companies, Inc., Indianapolis, IN (US)

(72) Inventors: David C. Adair, Indianapolis, IN (US); Frederick W. Gross, Carmel, IN (US)

(73) Assignee: Hurco Companies, Inc., Indianapolis, IN (US)

( * ) Notice: Subject to any disclaimer, the term of this patent is extended or adjusted under 35 U.S.C. 154(b) by 0 days.

(21) Appl. No.: 14/229,148

(22) Filed: Mar. 28, 2014

(65) Prior Publication Data

US 2015/0275557 A1    Oct. 1, 2015

(51) Int. Cl.
*E05D 11/00*    (2006.01)
*H02G 11/00*    (2006.01)

(52) U.S. Cl.
CPC ..... *E05D 11/0081* (2013.01); *E05Y 2900/606* (2013.01); *H02G 11/00* (2013.01); *Y10T 16/54028* (2015.01); *Y10T 16/5475* (2015.01); *Y10T 29/49117* (2015.01)

(58) Field of Classification Search
CPC ......... E05D 11/0081; E05D 3/06; E05D 3/12; E05D 3/14; E05D 3/18; E05D 3/186; Y10T 16/5475; Y10T 16/5476; Y10T 16/5478; Y10T 16/53833
USPC .................... 439/165, 31, 446, 467
See application file for complete search history.

(56) References Cited

U.S. PATENT DOCUMENTS

| 880,697 | A | * | 3/1908 | Soss ................................. | 16/357 |
|---|---|---|---|---|---|
| 1,484,093 | A | * | 2/1924 | Soss ................................. | 16/358 |
| 1,655,716 | A | * | 1/1928 | Soss ................................. | 16/348 |
| 1,682,860 | A | * | 9/1928 | Soss ................................. | 16/358 |
| 1,687,271 | A | * | 10/1928 | Soss ................................. | 16/358 |
| 1,688,996 | A | * | 10/1928 | Soss ................................. | 16/358 |
| 1,693,004 | A | * | 11/1928 | Soss ................................. | 16/358 |
| 1,925,209 | A | * | 9/1933 | Schwartz ......................... | 16/358 |
| 1,984,092 | A | * | 12/1934 | Soss ................................. | 16/369 |
| 2,021,702 | A | * | 11/1935 | Soss ................................. | 16/369 |
| 2,040,279 | A | * | 5/1936 | Soss ................................. | 16/273 |
| 2,157,027 | A | * | 5/1939 | Soss ................................. | 16/250 |
| 2,178,271 | A | * | 10/1939 | Soss ................................. | 16/358 |
| 2,227,849 | A | * | 1/1941 | Soss ................................. | 16/359 |
| 2,608,713 | A | * | 9/1952 | Soss ................................. | 16/337 |
| 3,001,224 | A | * | 9/1961 | Soss ................................. | 16/276 |
| 3,881,221 | A | * | 5/1975 | Schmidt ........................... | 16/366 |

(Continued)

FOREIGN PATENT DOCUMENTS

WO    97/35085    9/1997
WO    2009/115908    9/2009

OTHER PUBLICATIONS

International Search Report and Written Opinion dated Jul. 2, 2015 in PCT International Application No. PCT/US2015/022948.

*Primary Examiner* — Jeffrey O Brien
(74) *Attorney, Agent, or Firm* — Faegre Baker Daniels LLP

(57) ABSTRACT

A hinge is disclosed including a first connecting plate, a second connecting plate, a hinge element rotatably coupling said first and second connecting plates, a first pin coupled to the first connecting plate, wherein said first pin extends through a first end of the hinge element, a locking bracket coupled to the second connecting plate, and a second pin coupled to a second end of the hinge element, wherein said second pin extends through the locking bracket. The hinge optionally includes one or more friction locks, cableways, or cable tabs.

24 Claims, 10 Drawing Sheets

(56) References Cited

U.S. PATENT DOCUMENTS

| | | | |
|---|---|---|---|
| 5,278,725 A * | 1/1994 | Konno et al. | 361/679.09 |
| 6,168,341 B1 | 1/2001 | Chene et al. | |
| 6,829,808 B2 * | 12/2004 | Neukotter | 16/366 |
| RE41,143 E * | 2/2010 | Rangnekar et al. | 296/146.11 |
| 7,679,909 B2 * | 3/2010 | Spearing et al. | 361/699 |
| 7,754,950 B2 * | 7/2010 | Leach | 84/293 |
| 7,907,415 B2 * | 3/2011 | Ueyama | 361/749 |
| 8,307,509 B2 * | 11/2012 | Schau | 16/354 |
| 8,366,220 B2 * | 2/2013 | Oberhauser et al. | 312/405 |
| 8,863,361 B2 * | 10/2014 | Neukoetter | 16/368 |
| 8,982,542 B2 * | 3/2015 | Bohn | 361/679.06 |
| 2005/0134084 A1 * | 6/2005 | Rangnekar et al. | 296/146.11 |
| 2006/0113433 A1 | 6/2006 | Chen et al. | |
| 2008/0018212 A1 * | 1/2008 | Spearing et al. | 312/236 |
| 2009/0173207 A1 * | 7/2009 | Leach | 84/293 |
| 2010/0176701 A1 * | 7/2010 | Oberhauser et al. | 312/405 |
| 2010/0243314 A1 * | 9/2010 | Bryla et al. | 174/651 |
| 2012/0090135 A1 * | 4/2012 | Soh | 16/250 |
| 2014/0001880 A1 * | 1/2014 | Herglotz et al. | 307/104 |
| 2014/0077618 A1 * | 3/2014 | Herglotz et al. | 307/104 |
| 2014/0115825 A1 * | 5/2014 | Park | 16/223 |
| 2015/0031224 A1 * | 1/2015 | Dreisewerd et al. | 439/165 |

\* cited by examiner

ROTATABLE HINGE

FIELD OF THE DISCLOSURE

The present disclosure relates generally to rotatable hinges for use with cables, and, more particularly, to a hinge device for use with cables having two connecting plates, at least one rotatable hinge element, and at least one locking bracket connected with pins.

BACKGROUND AND SUMMARY

Hinges are widely used in devices where opening, closing, and rotation of components are required. In devices utilizing electricity or fluids, such as rotating viewing screens, hinges also must allow for passage of cables, tubes, or wires through the hinge. In this way, both components of the device to which the hinge is attached are provided with an operational element such as electricity or fluid.

The present application provides a rotatable hinge with cableways for connecting components of a device when rotation is required. The use of thin, high-definition viewing screens has increased in both industry and consumer applications. In one embodiment, multiple screens are connected by such hinges to allow for compact storage when the screens are not in use, as well as extended viewing area when the screens are in use.

Many times, only a screen fixed to a wall or stationary console will have a convenient connection to an electric or a network source. Thus, a secondary screen attached to the fixed screen by a rotatable hinge would require electricity and other connections, such as network connections, through the hinge. Connecting such hinged screens individually to wall-sources of operational elements, such as electricity, rather than being able to connect the screens in series with the operational elements proceeding through the connecting hinges, would be inconvenient.

The present disclosure therefore provides a rotatable hinge with cableways for situations in which rotation is required between two or more components and a connection is required between the components to supply an operational element such as electricity, a network connection, or a fluid.

In one embodiment of the disclosure, a hinge is provided. The hinge includes a first connecting plate, a second connecting plate, a hinge element rotatably coupling said first and second connecting plates, a first pin coupled to the first connecting plate, wherein said first pin extends through a first end of the hinge element, a locking bracket coupled to the second connecting plate, and a second pin coupled to a second end of the hinge element, wherein said second pin extends through the locking bracket.

In another embodiment of the disclosure, the locking bracket further comprises a friction lock. In still another embodiment of the disclosure, the locking bracket and hinge element further comprise cableways for one or more cables to traverse the hinge element from the first connecting plate to the second connecting plate. In yet another embodiment of the disclosure, the cableways comprise cable tabs.

In another embodiment of the disclosure, a hinge is provided including a first connecting plate, a second connecting plate, a hinge element rotatably coupling said first and second connecting plates, a first pin coupled to the first connecting plate, wherein said first pin extends through a first end of the hinge element, a locking bracket coupled to the second connecting plate, and a second pin coupled to a second end of the hinge element, wherein said second pin extends through the locking bracket, and further including a second hinge element rotatably coupling said first and second connecting plates, a third pin coupled to the second connecting plate, wherein said third pin extends through a first end of the second hinge element, a second locking bracket coupled to the first connecting plate, and a fourth pin coupled to a second end of the second hinge element, wherein said fourth pin extends through the second locking bracket.

In another embodiment, the locking brackets further comprise friction locks, and in still another embodiment, the first hinge element and the second hinge element have the same shape.

In yet another embodiment, the hinge further comprises a fifth pin that longitudinally traverses both hinge elements in between the connecting plates. In another embodiment, the locking brackets and hinge elements further comprise cableways for one or more cables to traverse the hinge elements from the first connecting plate to the second connecting plate. In still another embodiment, the cableways comprise cable tabs.

In other embodiments of the hinge, the connecting plates are movable between an opened position and a closed position, wherein the connecting plates are rotated 180 degrees relative to the closed position when in the opened position. In another embodiment, as the connecting plates move between the opened position and the closed position, the hinge element rotates about the first and second pins and the locking bracket shifts position relative to the second connecting plate. In other embodiments, as the connecting plates move between the opened position and the closed position, the hinge elements rotate about the first, second, third, and fourth pins, and the first locking bracket shifts position relative to the second connecting plate, and the second locking bracket shifts position relative to the first connecting plate.

Still in other embodiments, the cable tabs comprise protrusions, which extend outwardly from the locking bracket. In yet other embodiments, the cable tabs comprise sunken channels within the locking bracket. In still other embodiments, the hinge further comprises one or more springs.

Another embodiment of the present disclosure provides a method for mechanically and electrically connecting two electronic components comprising coupling a first connecting plate, a second connecting plate with a locking bracket, and a hinge element by a first pin coupled to the first connecting plate, wherein said first pin extends through a first end of the hinge element and a second pin coupled to a second end of the hinge element, wherein said second pin extends through the locking bracket, attaching the first connecting element to a first electronic component, attaching the second connecting element to a second electronic component, and providing one or more wired connections between the electronic components through a cableway formed by the connecting plates and hinge element.

In still another embodiment, a method for mechanically and electrically connecting two electronic components further comprises inserting a second hinge element rotatably coupling said first and second connecting plates, inserting a third pin coupled to the second connecting plate, wherein said third pin extends through a first end of the second hinge element, coupling a second locking bracket to the first connecting plate, and inserting a fourth pin coupled to a second end of the second hinge element, wherein said fourth pin extends through the second locking bracket.

In yet another embodiment, the method further comprises attaching at least one spring between the electronic components.

BRIEF DESCRIPTION OF THE DRAWINGS

The above-mentioned aspects of the present teachings and the manner of obtaining them will become more apparent and the teachings will be better understood by reference to the following description of the embodiments taken in conjunction with the accompanying drawings, wherein.

Corresponding reference characters indicate corresponding parts throughout the several views.

DETAILED DESCRIPTION OF THE DRAWINGS

The embodiments disclosed herein are not intended to be exhaustive or to limit the invention to the precise form disclosed in the following detailed description. Rather, the embodiments were chosen and described so that others skilled in the art may utilize their teachings.

Figure 1:
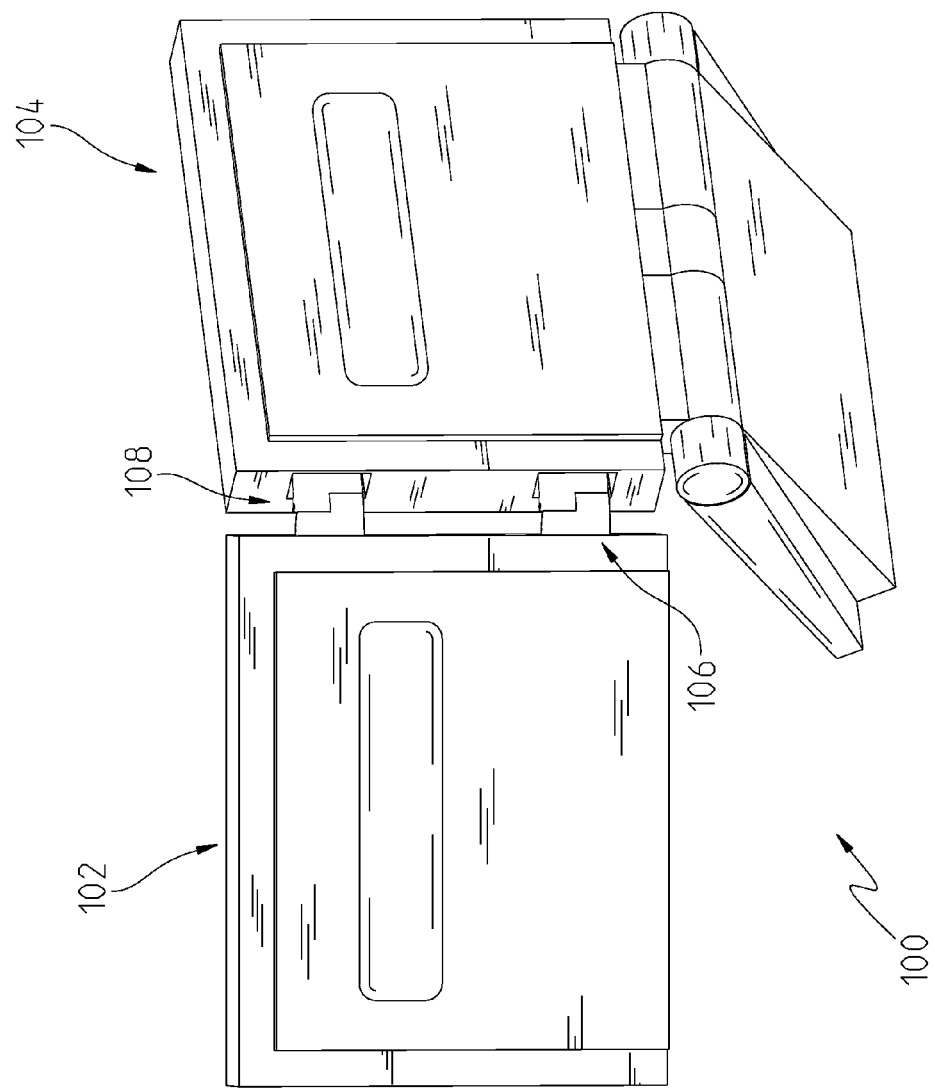
FIG. 1 is a rear view of screens rotatably connected by exemplary hinges.

Referring now to FIG. 1, a rear view of a device 100 having a pair of viewing screens 102, 104 rotatably connected by exemplary hinges 106, 108 is shown. Screens 102, 104, as displayed, are in an opened or viewable, in-use position, and could be rotatably moved to a closed position. In a closed position, screen 102 would rest in front of and parallel to screen 104. In other embodiments, more or fewer hinges could be used to rotatably connect screens 102, 104. Optionally, more screens could be connected in series, for example at the non-hinged sides of screens 102, 104.

Figure 2:
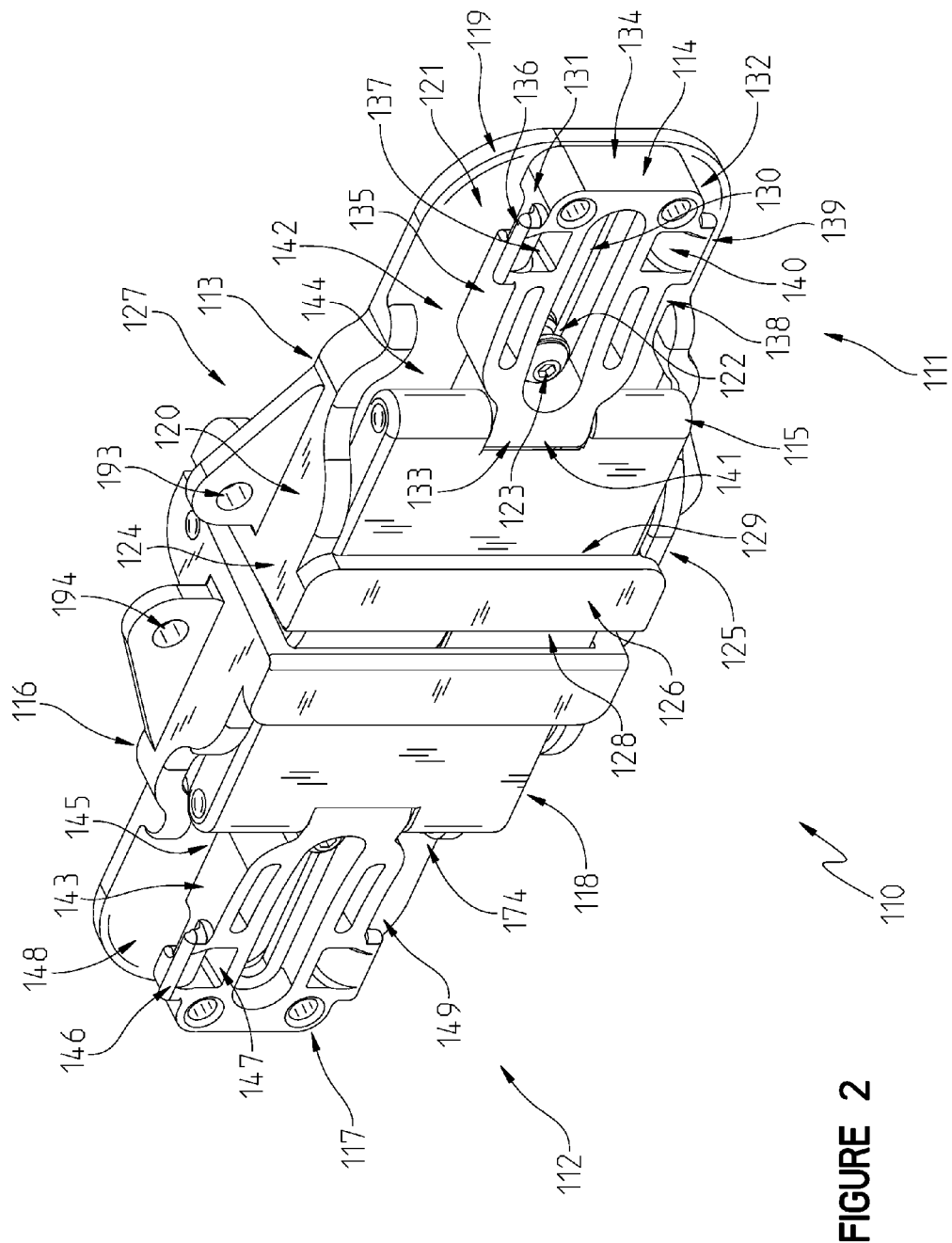
FIG. 2 is a perspective view of an exemplary hinge in an opened position.

Referring to FIG. 2, an exemplary hinge 110 is shown. Hinge 110 has a first half 111 and a second half 112. First half 111 includes a connecting plate 113, a locking bracket 114, and a hinge element 115. Second half 112 similarly includes a connecting plate 116, a locking bracket 117, and a hinge element 118. Connecting plate 113, locking bracket 114 and hinge element 115 of first half 111 are identical to the corresponding elements of second half 112 in the embodiment shown. Hinge 110 generally includes two hinge elements 115, 118, two locking brackets 114, 117, and two connecting plates 113, 116.

Figure 10:
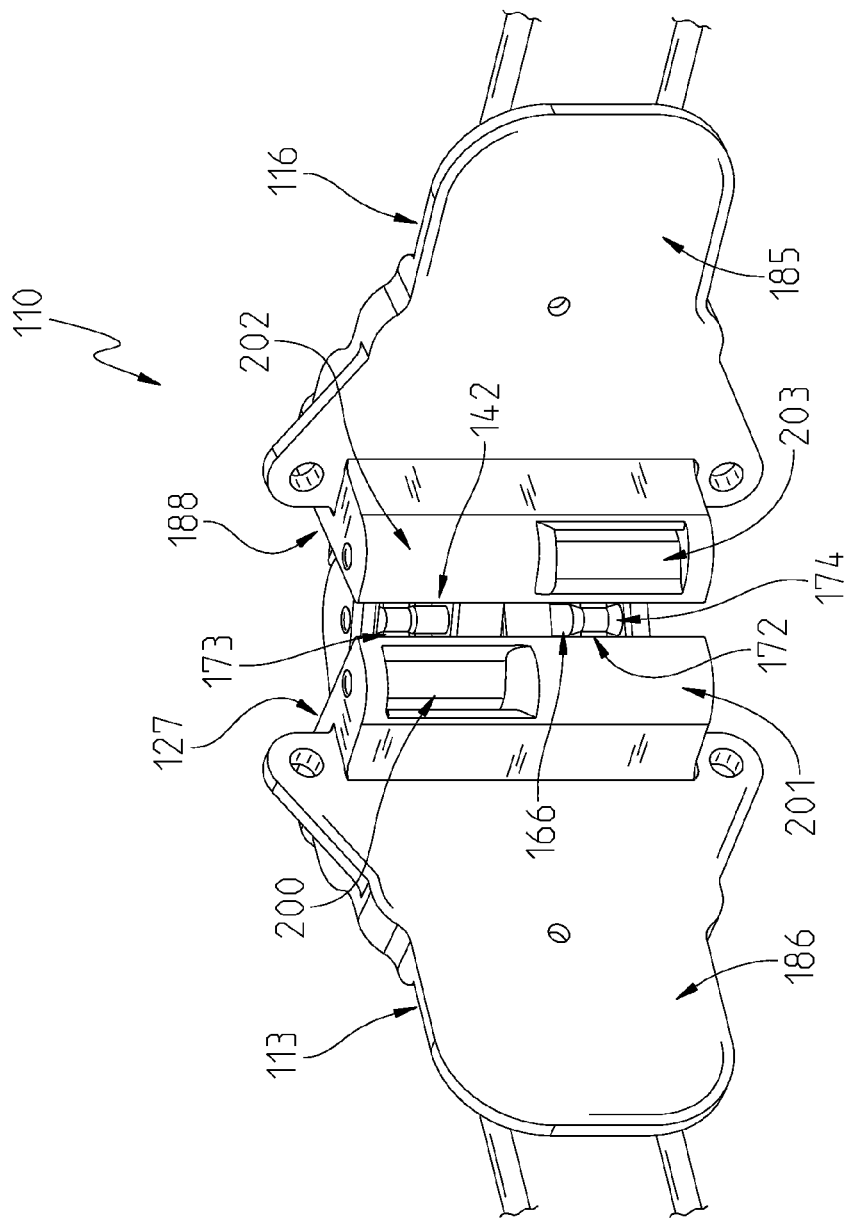
FIG. 10 is a front view of the exemplary hinge of FIG. 2 in a substantially closed position.

Connecting plate 113 includes a substantially flat body 119 and a hinge housing 120. Body 119 includes a substantially flat rear surface 121 and a substantially flat front surface opposite rear surface 121, which will be described further below. Rear surface 121 includes a threaded opening 122 configured to receive a friction lock 123. Threaded opening 122 on rear surface 121 of connecting plate 113, in one embodiment, is bored entirely through connecting plate 113 and is visible on a front surface 186 (FIG. 10). In other embodiments, threaded opening 122 is not bored entirely through connecting plate 113 and is not visible on front surface 186.

Hinge housing 120 includes an upper wall 124, a lower wall 125, a front wall 126 extending between upper wall 124 and lower wall 125, and a rear wall 127 extending between upper wall 124 and lower wall 125. Upper, lower, front and rear walls 124, 125, 126, 127 together form an opening 128 at one end of hinge housing 120 and another opening 129 at the other end of hinge housing 120. Hinge element 115 moves within walls 124, 125, 126, 127 of housing 120 as hinge 110 is moved between an opened and closed position, as is further described below.

Locking bracket 114 has an elongate central slot 130 for receiving friction lock 123 as it is threaded into opening 122. Locking bracket 114 also has an upper wall 131, a lower wall 132, a first end 133 and a second end 134. Upper wall 131 has an upper surface 135. A cable tab 136 including an aperture 137 extends or protrudes from upper wall 131 above upper surface 135. Lower wall 132 has a lower surface 138. A cable tab 139 including an aperture 140 extends or protrudes from lower wall 132 below lower surface 138. A bore 141 extends through first end 133 of locking bracket 114.

Locking bracket 114 is coupled to rear surface 121 of connecting plate 113 by friction lock 123, and locking bracket 117 is similarly coupled to connecting plate 116. Friction lock 123 is a tightenable and loosenable bolt in the embodiment shown. If loosened, adjustable friction lock 123 allows locking bracket 114 to slide relative to rear surface 121 of connecting plate 113 as hinge 110 is moved between an opened position and a closed position. While adjustable friction lock 123 as shown comprises a bolt, other tightening means suitable for creating friction between locking bracket 114 and connecting plate 113 are envisioned, such as a clasp or clip.

Still referring to FIG. 2, hinge 110 has a cableway 142. Cableway 142 is formed by upper surface 135 of locking bracket 114 and corresponding upper surface 143 of locking bracket 117. Cableway 142 also includes interior space 144, which is formed between hinge element 115 and rear surface 121 of connecting plate 113, and corresponding interior space 145, which is formed between hinge element 118 and a substantially flat rear surface 148 of connecting plate 116. Interior spaces 144, 145 allow passage of a cable or other connection between the two halves 111, 112 of hinge 110.

In other embodiments, cableway 142 may be formed by sunken upper surfaces 135, 143 of locking brackets 114, 117, or cableway 142 may be enclosed such that a cable is not visible from either side of hinge 110. Cable tabs 136, 146, in the embodiment shown, include respective apertures 137, 147 that receive cable ties 179, 180 (FIG. 8) and permit attachment of a cable to locking brackets 114, 117. Other suitable tying or connecting means could also be used instead of cable ties 179, 180 such as clips or fasteners.

A second cableway 174 that is identical to cableway 142 is provided along lower surfaces 138, 149 of locking brackets 114, 117 for routing a second cable between components connected to connecting plates 113, 116.

In the embodiment shown, hinge elements 115, 118 and locking brackets 114, 117 have the same shape. In other embodiments, the hinge elements and locking brackets may not be the same shape, or only one hinge element or only one locking bracket may be used with connecting plates 113, 116.

Figure 3:
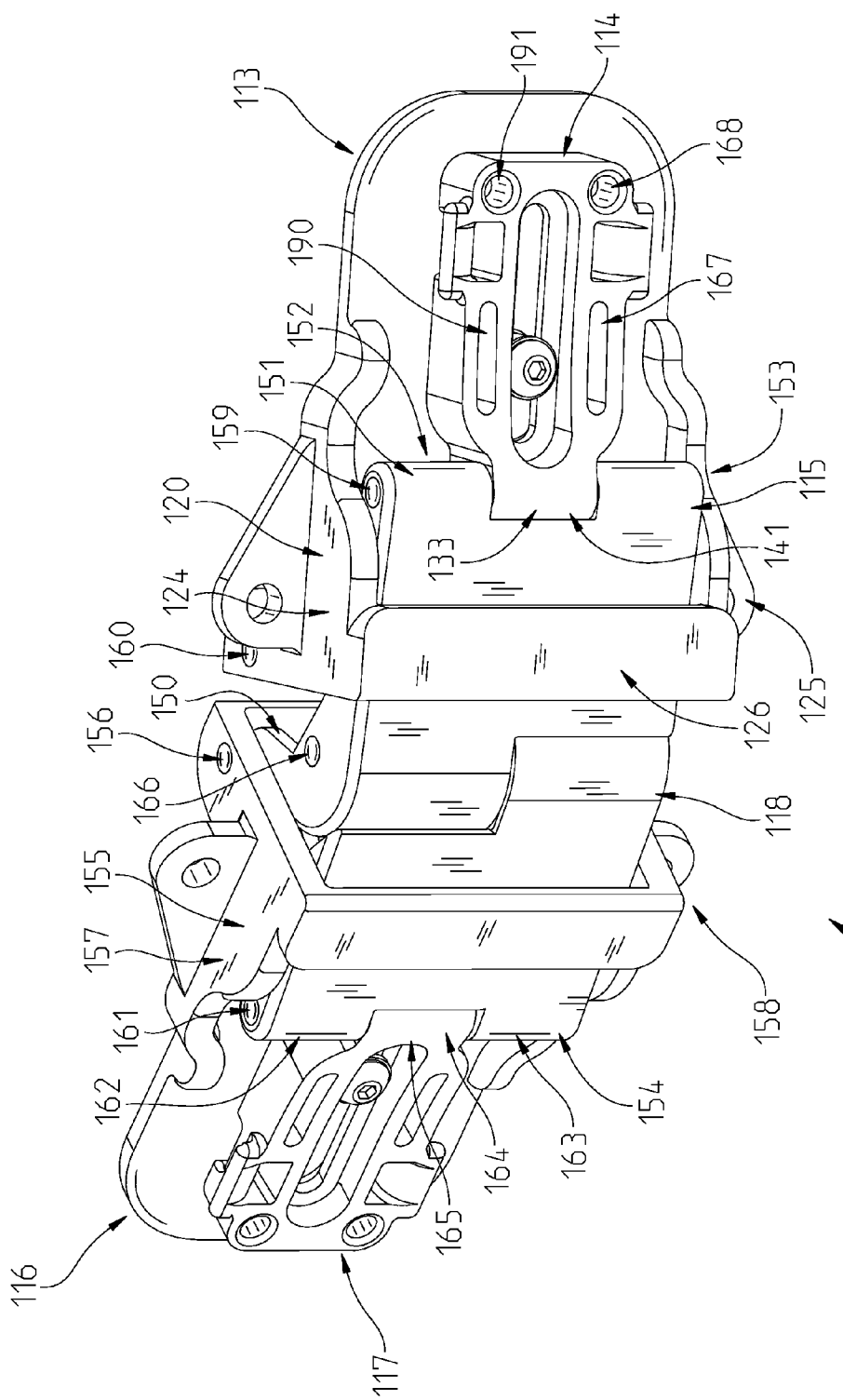
FIGS. 3-6 are perspective views of the exemplary hinge of FIG. 2 transitioning from an opened position to a closed position.

Referring now to FIG. 3, a perspective view of hinge 110 transitioning from an opened position to a closed position is shown. Hinge element 115 has a first end 150 with a bore and a second end 151. Second end 151 has an upper portion 152 with a bore and a lower portion 153 with a bore.

Similarly, hinge element 118 has a first end (not shown, but behind and substantially parallel to front wall 126 of hinge housing 120) with a bore and a second end 154. Second end 154 has an upper portion 162 with a bore and a lower portion 163 with a bore. Connecting plate 116 includes a hinge housing 155, similar to hinge housing 120, with upper wall 157 and lower wall 158.

First end 150 of hinge element 115 is coupled to connecting plate 116 within hinge housing 155 by a cylindrical pin 156. Pin 156 is coupled to upper wall 157 of hinge housing 155, extends through first end 150 of hinge element 115, and is coupled to lower wall 158 of hinge housing 155. Therefore, first end 150 of hinge element 115 is rotatably coupled to hinge housing 155 by pin 156. In a similar fashion, cylindrical pin 160 is coupled to upper wall 124 of hinge housing 120, proceeds through first end (not shown, but behind and substantially parallel to front wall 126 of hinge housing 120) of hinge element 118, and is coupled to lower wall 125 of hinge housing 120.

Second end 151 of hinge element 115 is rotatably coupled to first end 133 of locking bracket 114 by cylindrical pin 159. Pin 159 extends through upper portion 152 of second end 151 of hinge element 115, through bore 141 of first end 133 of locking bracket 114, and through lower portion 153 of hinge element 115. In a similar fashion, cylindrical pin 161 extends through upper portion 162 of second end 154 of hinge element 118, through bore 165 of first end 164 of hinge element 118, and through lower portion 163 of hinge element 118. Pins 159, 161 therefore allow for rotatable coupling between first ends 133, 164 of locking brackets 114, 117 and second ends 151, 154 of hinge elements 115, 118, respectively.

Hinge 110 also has cylindrical pin 166, which is coupled within and extends through hinge elements 115, 118 in between hinge housings 120, 155. In the embodiment shown, five pins 156, 159, 160, 161, 166 are used to couple connecting plates 113, 116. However, in other embodiments more or fewer pins could be used. In one embodiment, only pins 156, 159 would be required for use with one hinge element 115 and one locking bracket 114 to connect connecting plates 113, 116.

Referring again to locking bracket 114, a lower elongate channel 167 and a lower circular aperture 168 are shown. Such an elongate channel and aperture are envisioned to be used in guiding or connecting means. Locking bracket 114 has a similar upper elongate channel 190 and a similar upper circular aperture 191. Locking bracket 117 is shown with similar elongate channels and circular apertures.

Figure 4:
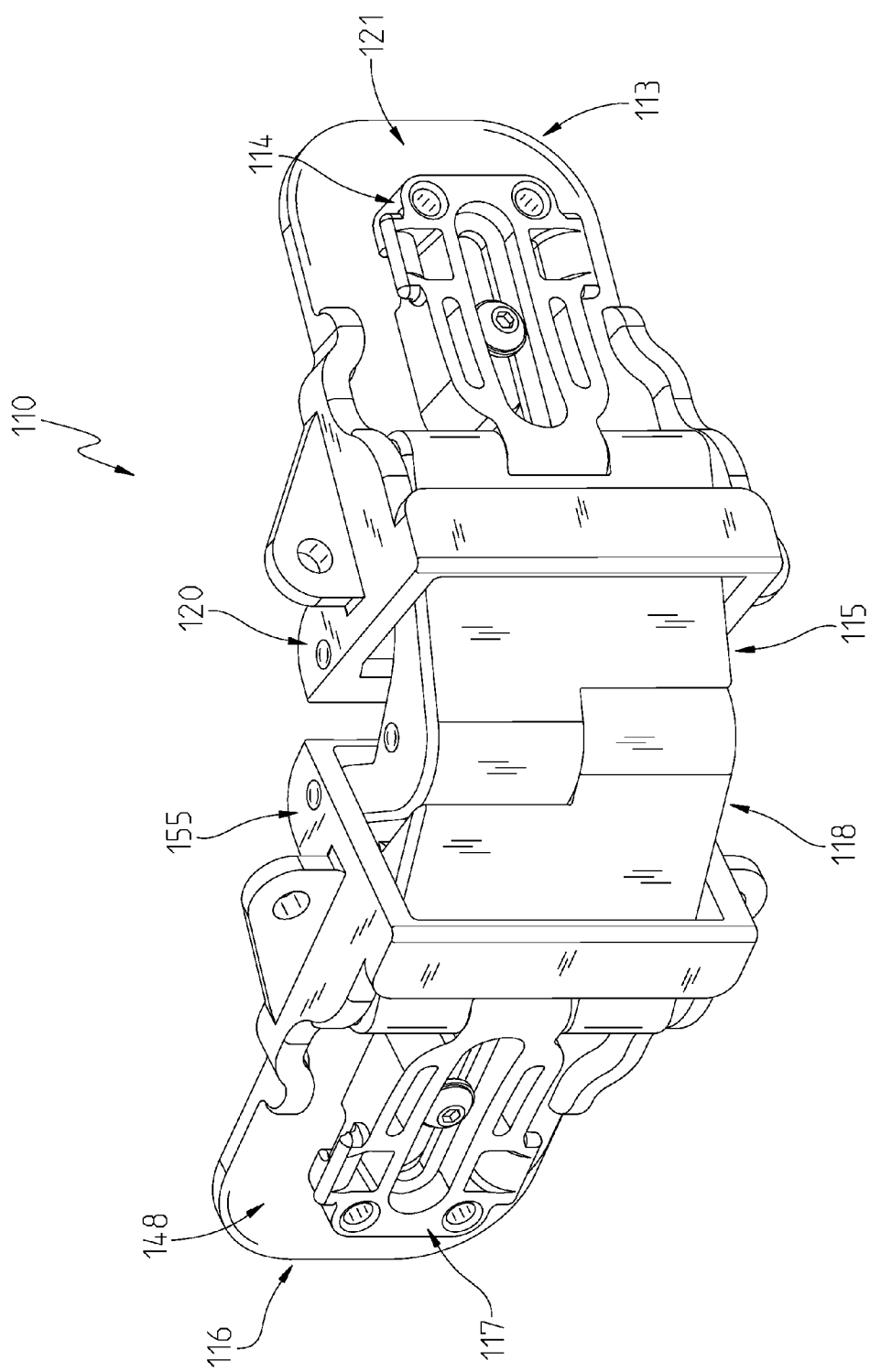

Referring now to FIG. 4, a perspective view of hinge 110 transitioning from an opened position to a closed position is shown. Locking bracket 114 has shifted to the left relative to connecting plate 113 by sliding over rear surface 121, as compared to its location in FIG. 2. Locking bracket 117 has shifted to the right relative to connecting plate 116 by sliding over rear surface 148, as compared to its location in FIG. 2. Hinge elements 115, 118 are shown to have rotatably turned within hinge housings 120, 155 relative to their respective positions in FIG. 2.

Figure 5:
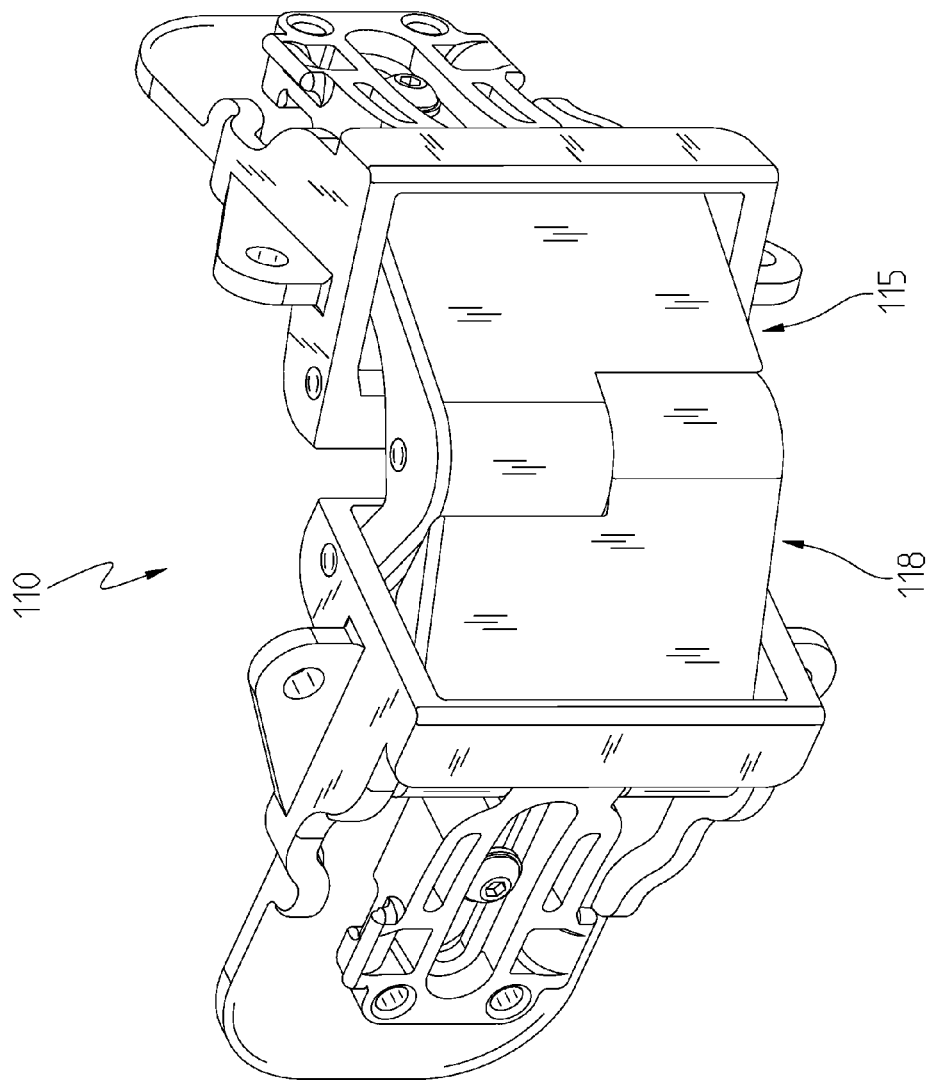
Figure 6:
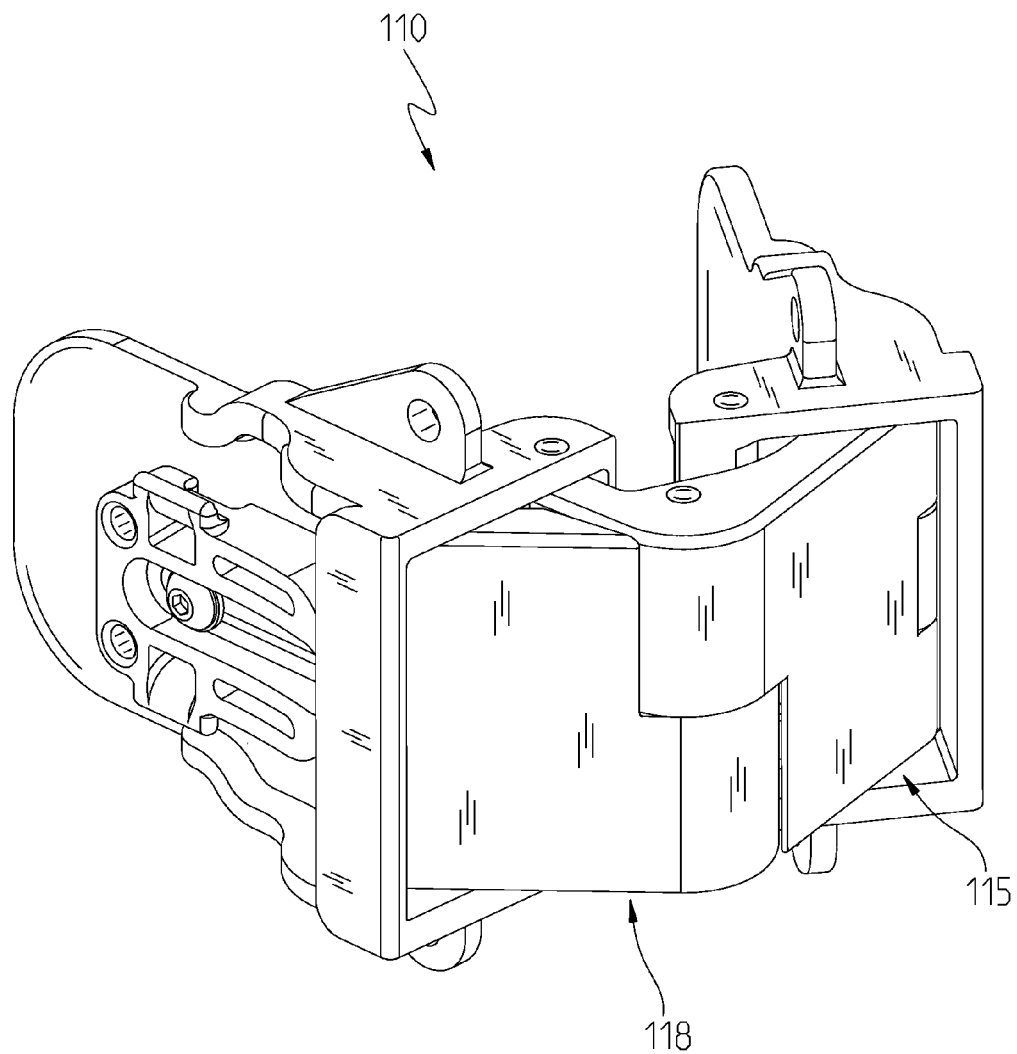

Referring now to FIGS. 5 and 6, further perspective views of hinge 110 transitioning from an opened position to a closed position are shown.

Figure 7:
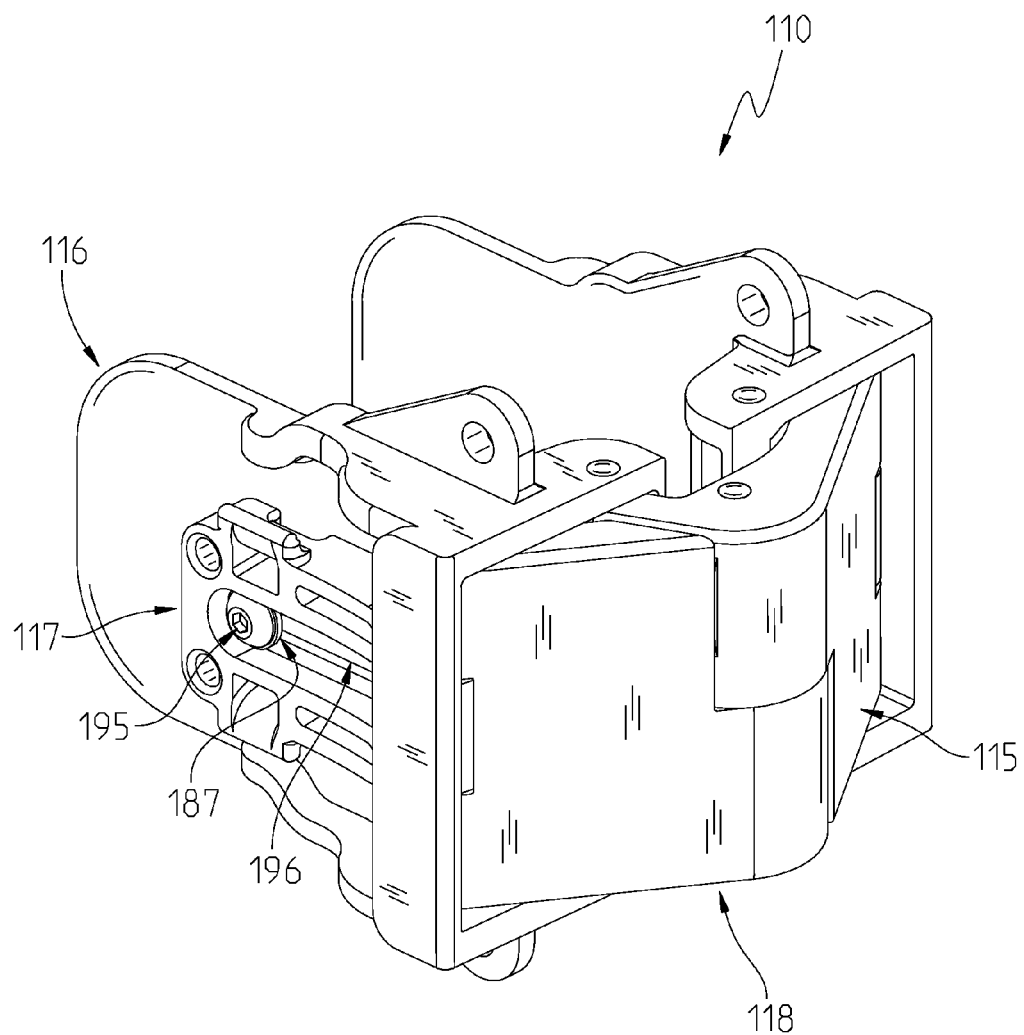
FIG. 7 is a perspective view of the exemplary hinge of FIG. 2 in a closed position.

Referring to FIG. 7, a perspective view of hinge 110 in a closed position is shown. Connecting plate 116 is shown with a threaded opening 187, and locking bracket 117 is shown with a friction lock 195, and an elongate central slot 196. Locking bracket 117 has shifted to the right relative to connecting plate 116, as compared to its location in FIG. 2.

Friction lock 195 is a tightenable and loosenable bolt in the embodiment shown, and is stationary relative to, and interconnected with, connecting plate 116 by threaded opening 187. Tightening friction lock 195 into connecting plate 116 clamps locking bracket 117 between the head of friction lock 195 and connecting plate 116 and thereby prevents the rotatable movement of hinge 110. Friction lock 195 is optionally tightened or loosened by the user at any point in the rotation of hinge 110 as the elongate central slot 196 of locking bracket 117 moves relative to friction lock 195.

Figure 8:
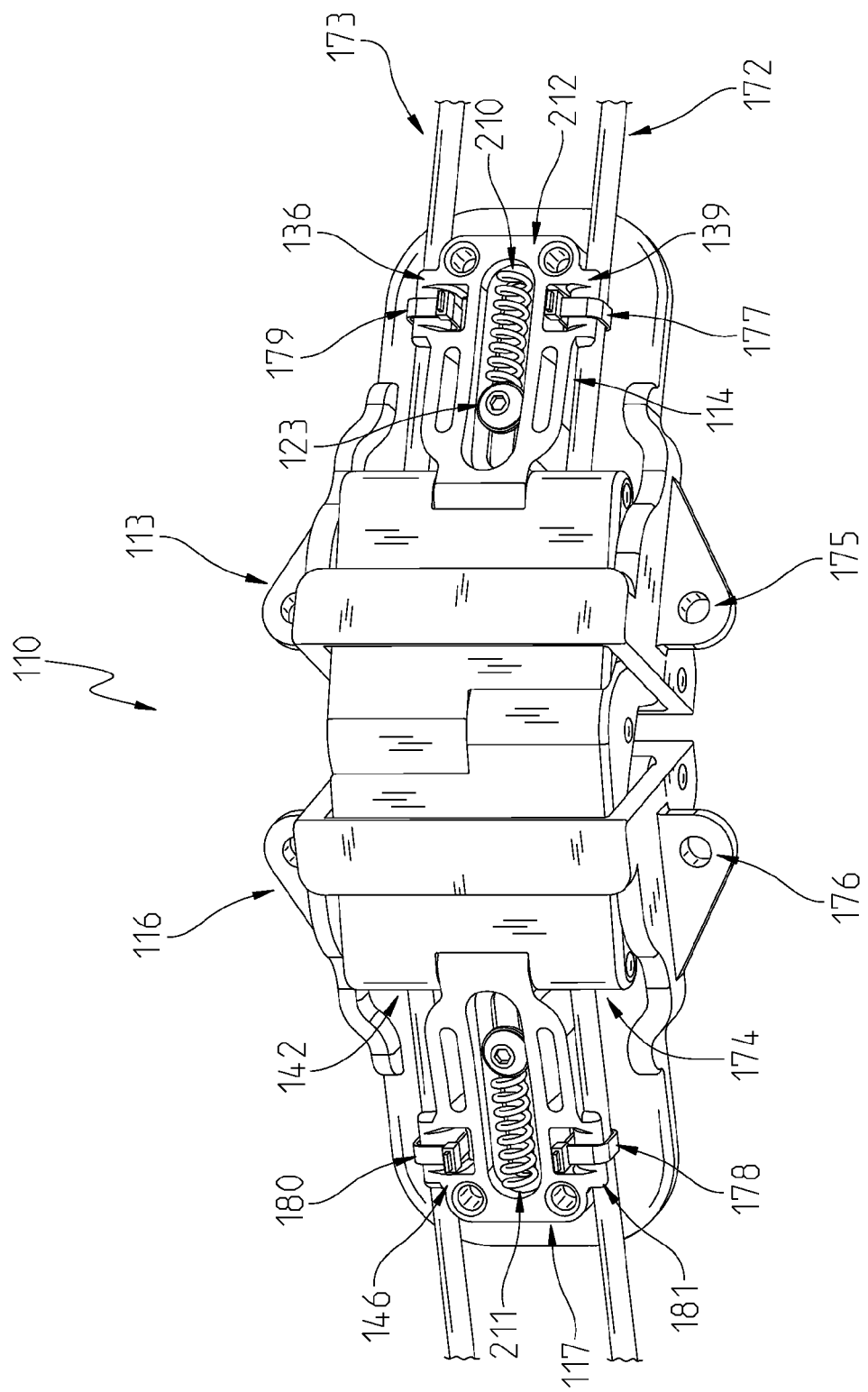
FIG. 8 is a perspective view of the exemplary hinge of FIG. 2 with cables and ties in a substantially opened position.

Now referring to FIG. 8, a perspective view of exemplary hinge 110 with cables 172, 173 is shown. Cable 173 proceeds through cableway 142 between connecting plates 113, 116. Similarly, cable 172 proceeds through cableway 174 between connecting plates 113, 116. Hinge 110 has connecting plate apertures 175, 176 used for attaching connecting plates 113, 116, respectively, to components that need to be rotated relative to one another, such as viewing screens. Bolts, screws, or other similar fasteners extend through apertures 175, 176 to connect hinge 110 to components such as screens 102, 104 (FIG. 1). Similar apertures 193, 194, shown in FIG. 2, are located along the upper edges of connecting plates 113, 116, respectively. More or fewer apertures could be used on connecting plates 113, 116 to attach the plates to components, the apertures could be placed in alternative locations on connecting plates 113, 116, and other attachment means could be used such as adhesives.

Hinge 110 has a pair of ties 177, 178, which are shown securing cable 172 to lower cable tabs 139, 181, respectively, while cable 172 rests in cableway 174. Similarly, a pair of ties 179, 180 are shown securing cable 173 to upper cable tabs 136, 146, respectively, while cable 173 rests in cable way 142. In the embodiment shown in FIG. 8, cable ties are used as ties 177, 178, 179, 180 with cable tabs 139, 181, 136, 146, respectively. Other guiding means are envisioned for use with cableways 142, 174, such as a sunken surface in which a cable could rest and enclosed cableways through which a cable or cables would be fed.

Still referring to FIG. 8, locking bracket 114 is shown with spring 210, and locking bracket 117 is shown with spring 211. Springs 210, 211 are optional and may be removably attached to hinge 110. Spring 210 is shown to rest in elongate central slot 130, and is attached to friction lock 123 and a first end 212 of elongate central slot 130. When spring 210 is biased to pull friction lock 123 and first end 212 together, this biases hinge 110 toward a closed position (shown in FIG. 7). When spring 210 is biased to push friction lock 123 and first end 212 apart, this biases hinge 110 toward an opened position (shown in FIG. 2). Springs 210, 211 may be compression or extension/expansion type springs, depending on the direction of the force springs 210, 211 apply, or the desired direction of hinge travel.

More or fewer springs may be used, and springs could be used in different locations of hinge 110 to apply a force that would either rotate connecting plates 113, 116 toward an opened or a closed position. For example, a spring (not shown) might be placed between rear wall 127 and rear wall 188 shown in FIG. 10, and might apply an inward force to bring connecting plates 113, 116 together toward a closed position; or such a spring might apply an outward force to separate connecting plates 113, 116 and move them toward an opened position.

Figure 9:
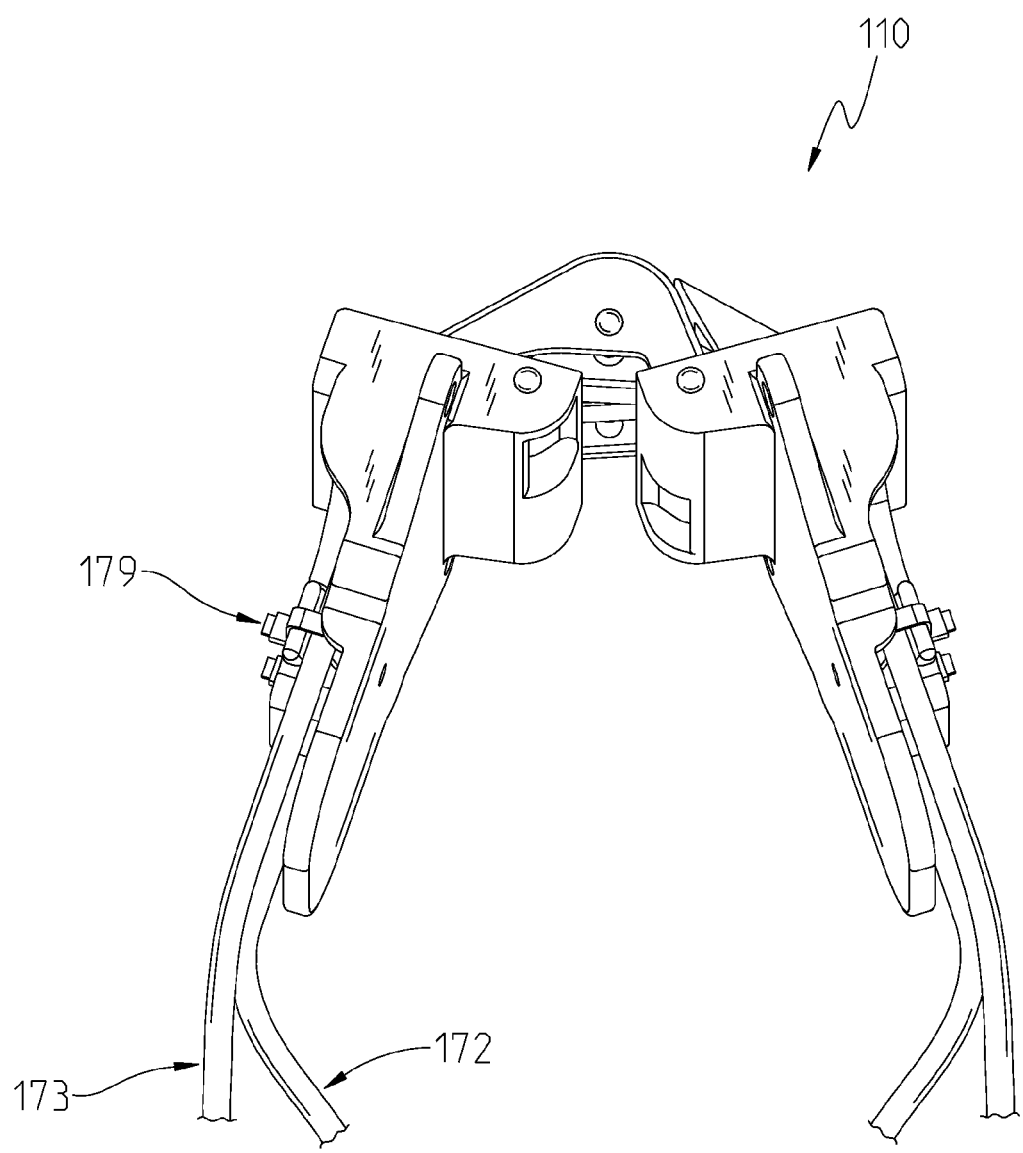
FIG. 9 is a top view of the exemplary hinge of FIG. 2 with cables and ties transitioning from a substantially opened position to a substantially closed position.

Now referring to FIG. 9, a top view of hinge 110 is shown transitioning between a substantially opened position and a substantially closed position.

Referring to FIG. 10, a front view of exemplary hinge 110 in a substantially closed position is shown. In this view, a front surface 185 of connecting plate 116 and a front surface 186 of connecting plate 113 are shown. When hinge 110 is in use, surfaces 185, 186 abut the components requiring rotation relative to one another, such as viewing screens 102, 104 (FIG. 1). Use of any suitable connecting means such as bolts, screws, clamps, clips, adhesives, or any combination of connecting means is envisioned.

Cables 172, 173 are shown traversing cableways 174, 142, respectively. Cables 172, 173, in the embodiment shown, proceed around cylindrical pin 166 while traversing cableways 174, 142 between connecting plates 116, 113. A large amount of slack is not required in cables 172, 173, because pin 166 has a relatively small diameter. Rear wall 127 of hinge housing 120 and a rear wall 188 of hinge housing 155 are also shown. Rear walls 127, 188 support and house pins 160, 156, shown in FIG. 2. As noted, pin 156 couples with hinge housing 155 and a first end 150 of hinge element 115, and pin 160 couples with hinge housing 120 and a first end of hinge element 118. Pins 156, 160 are also coupled within and supported by rear walls 188, 127 of hinge housings 155, 120.

More particularly, rear wall 127 of housing 120 has indented upper portion 200 and outwardly rounded bottom portion 201. Rear wall 188 has outwardly rounded upper portion 202 and indented lower portion 203. The first end 150 of hinge element 115 rests within outwardly rounded upper portion 202 of rear wall 188 as first end 150 is coupled to housing 155 by pin 156. The first end (not shown) of hinge element 118 similarly rests in outwardly rounded bottom portion 201 of rear wall 127 as the first end is coupled to housing 120 by pin 160.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:
1. A hinge comprising:
a first connecting plate;
a second connecting plate;
a hinge element rotatably coupling said first and second connecting plates;
a first pin coupled to the first connecting plate, wherein said first pin extends through a first end of the hinge element;
a locking bracket movably attached to the second connecting plate by a friction lock; and
a second pin coupled to a second end of the hinge element, wherein said second pin extends through the locking bracket;
wherein the friction lock is movable between a locking position wherein the friction lock increases friction between the locking bracket and the second connecting plate to inhibit rotatable movement of the hinge and a loosened position wherein the friction lock reduces friction between the locking bracket and the second connecting plate to permit rotatable movement of the hinge.
2. The hinge according to claim 1, wherein the locking bracket and hinge element further comprise cableways for one or more cables to traverse the hinge element from the first connecting plate to the second connecting plate.
3. The hinge according to claim 2, wherein the cableways comprise cable tabs.
4. The hinge according to claim 1, further comprising at least one spring.
5. The hinge according to claim 1, further comprising:
a second hinge element rotatably coupling said first and second connecting plates;
a third pin coupled to the second connecting plate, wherein said third pin extends through a first end of the second hinge element;
a second locking bracket coupled to the first connecting plate; and
a fourth pin coupled to a second end of the second hinge element, wherein said fourth pin extends through the second locking bracket.
6. The hinge according to claim 5, wherein said first hinge element and said second hinge element have the same shape.
7. The hinge according to claim 5, further comprising a fifth pin that longitudinally traverses both hinge elements in between the connecting plates.
8. The hinge according to claim 5, wherein the locking brackets and hinge elements further comprise cableways for one or more cables to traverse the hinge elements from the first connecting plate to the second connecting plate.
9. The hinge according to claim 5, further comprising at least one spring.
10. The hinge according to claim 8, wherein the cableways comprise cable tabs.
11. The hinge according to claim 1, wherein the connecting plates are movable between an opened position and a closed position, and wherein the connecting plates are rotated 180 degrees relative to the closed position when in the opened position.
12. The hinge according to claim 11, wherein as the connecting plates move between the opened position and the closed position, the hinge element rotates about the first and second pins and the locking bracket shifts position relative to the second connecting plate.
13. The hinge according to claim 5, wherein the connecting plates are movable between an opened position and a closed position, and wherein the connecting plates are rotated 180 degrees relative to the closed position when in the opened position.
14. The hinge according to claim 13, wherein as the connecting plates move between the opened position and the closed position, the hinge elements rotate about the first, second, third, and fourth pins, and the first locking bracket shifts position relative to the second connecting plate, and the second locking bracket shifts position relative to the first connecting plate.
15. The hinge according to claim 3, wherein the cable tabs comprise protrusions which extend outwardly from the locking bracket.
16. The hinge according to claim 3, wherein the cable tabs comprise sunken channels within the locking bracket.
17. The hinge according to claim 10, wherein the cable tabs comprise protrusions which extend outwardly from the locking bracket.
18. The hinge according to claim 10, wherein the cable tabs comprise sunken channels within the locking bracket.
19. A method for mechanically and electrically connecting two electronic components comprising:
coupling a first connecting plate, a second connecting plate coupled to a locking bracket, and a hinge element by a first pin coupled to the first connecting plate, wherein said first pin extends through a first end of the hinge element and a second pin disposed within a second end of the hinge element and connected to the second connecting plate via the locking bracket, wherein said second pin extends through the locking bracket;

attaching the first connecting plate to a first electronic component;

attaching the second connecting plate to a second electronic component; and providing one or more wired connections between the electronic components through a cableway formed by the connecting plates and hinge element; and providing a friction lock that is movable between a locking position wherein the friction lock increases friction between the locking bracket and the second connecting plate to inhibit rotatable movement of the hinge and a loosened position wherein the friction lock reduces friction between the locking bracket and the second connecting plate to permit rotatable movement of the hinge.

20. The method according to claim 19, further comprising:

inserting a second hinge element rotatably coupling said first and second connecting plates;

inserting a third pin coupled to the second connecting plate, wherein said third pin extends through a first end of the second hinge element;

coupling a second locking bracket to the first connecting plate; and inserting a fourth pin coupled to a second end of the second hinge element, wherein said fourth pin extends through the second locking bracket.

21. The method according to claim 19, further comprising attaching at least one spring between the electronic components.

22. A hinge comprising:
a first connecting plate;
a second connecting plate;
a first hinge element rotatably coupling said first and second connecting plates;
a first pin coupled to the first connecting plate, wherein said first pin extends through a first end of the first hinge element;
a first locking bracket slidably coupled to the second connecting plate;
a second pin coupled to a second end of the hinge element, wherein said second pin extends through the first locking bracket;
a second hinge element rotatably coupling said first and second connecting plates;
a third pin coupled to the second connecting plate, wherein said third pin extends through a first end of the second hinge element;
a second locking bracket coupled to the first connecting plate; and
a fourth pin coupled to a second end of the second hinge element, wherein said fourth pin extends through the second locking bracket;
wherein the locking brackets and hinge elements further comprise cableways for one or more cables to traverse the hinge elements from the first connecting plate to the second connecting plate; and
wherein said locking brackets further comprise friction locks, wherein the friction locks are bolts, wherein the friction lock bolts are tightenable between the locking brackets and the connecting plates to prevent rotatable movement of the hinge and loosenable between the locking brackets and the connecting plates to allow rotatable movement of the hinge.

23. The hinge of claim 1, wherein the locking bracket further comprises a slot configured to house at least one of the friction lock and a spring.

24. The method of claim 19, wherein the locking bracket further comprises a slot configured to house at least one of a friction lock and a spring.

* * * * *